Oct. 8, 1940.   C. K. BRYCE ET AL   2,217,194
METHOD FOR MAKING BLOWPIPE NOZZLES
Filed Oct. 9, 1937   3 Sheets-Sheet 1
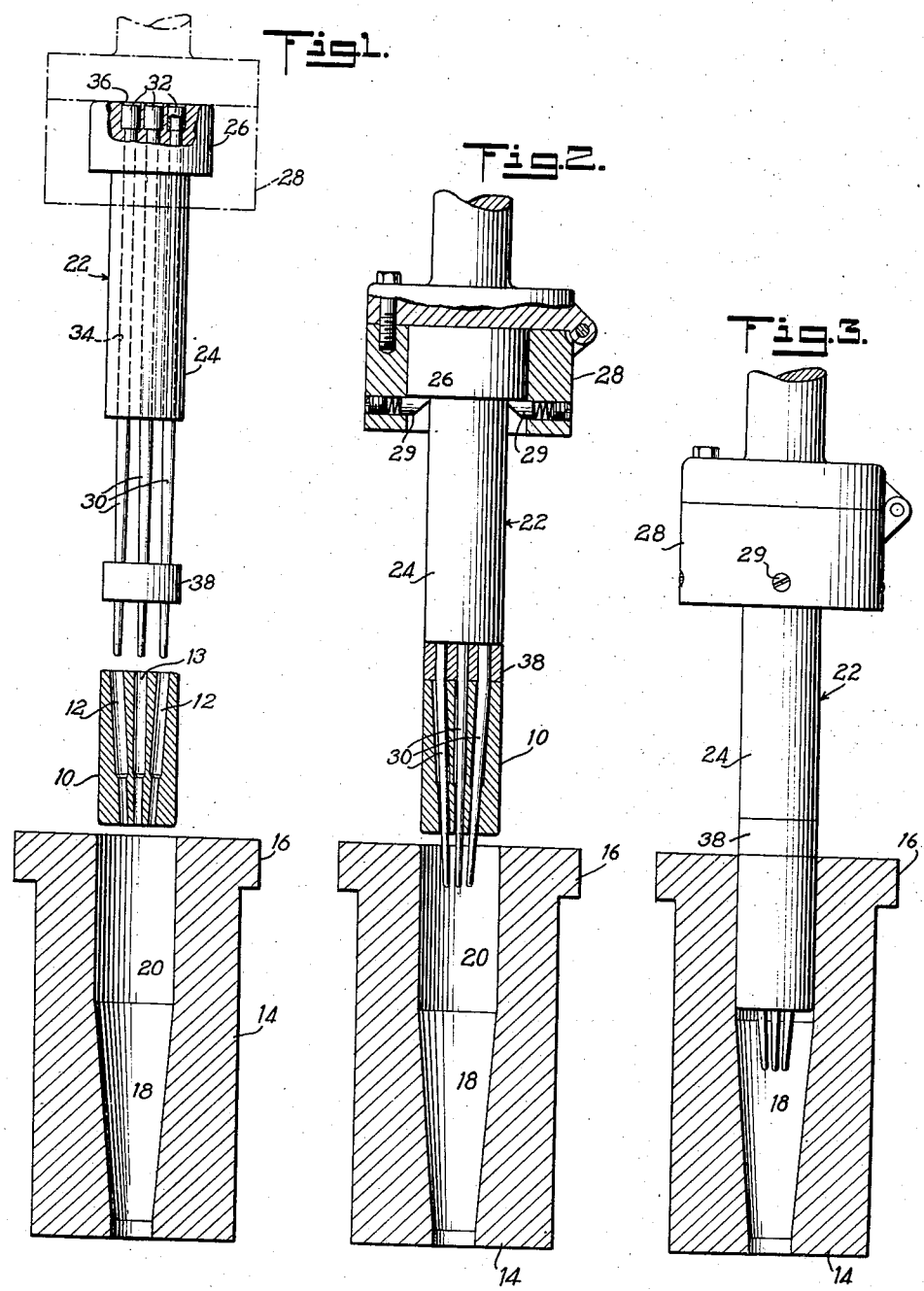
INVENTORS
CHALMERS K. BRYCE
PETER R. ARONSON
BY
ATTORNEY Oct. 8, 1940.  C. K. BRYCE ET AL  2,217,194
METHOD FOR MAKING BLOWPIPE NOZZLES
Filed Oct. 9, 1937  3 Sheets-Sheet 2
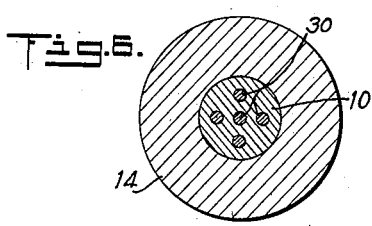
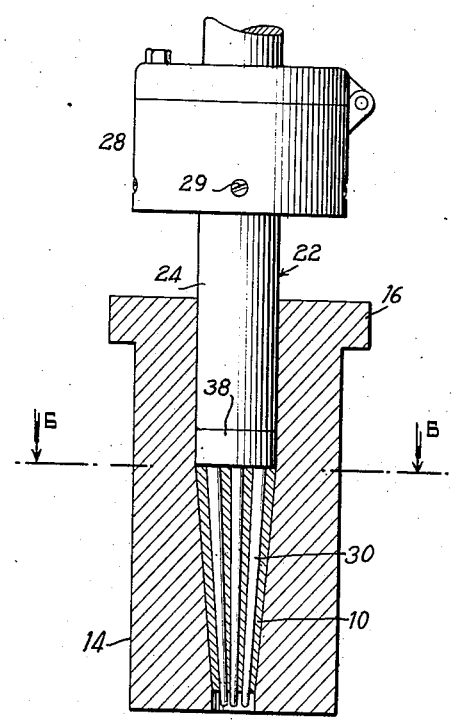
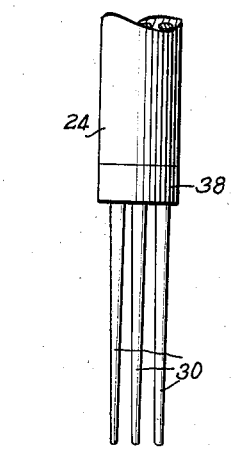
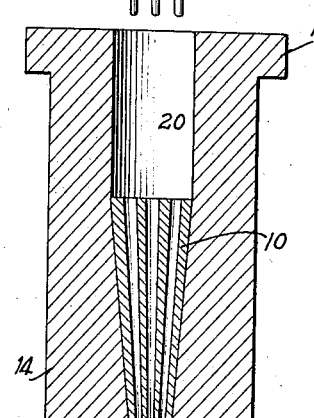
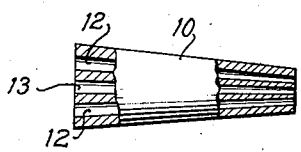
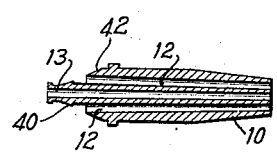
INVENTORS
CHALMERS K. BRYCE
PETER R. ARONSON
BY
ATTORNEY Oct. 8, 1940.  C. K. BRYCE ET AL  2,217,194
METHOD FOR MAKING BLOWPIPE NOZZLES
Filed Oct. 9, 1937  3 Sheets-Sheet 3
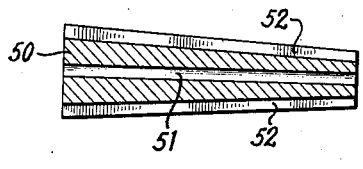
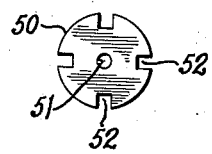
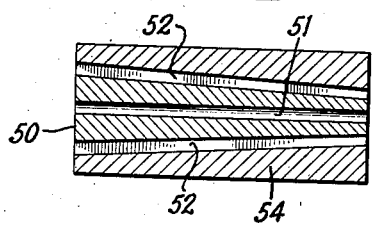
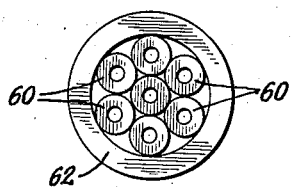
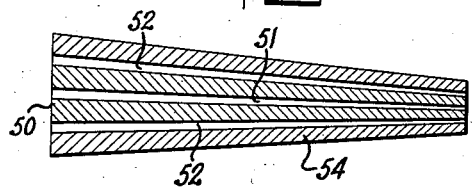
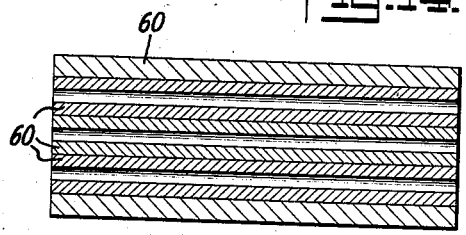
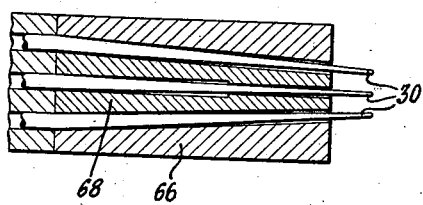
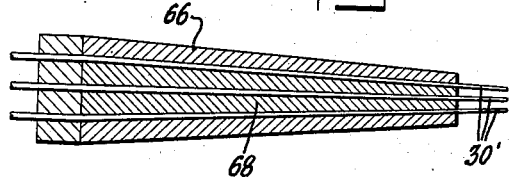
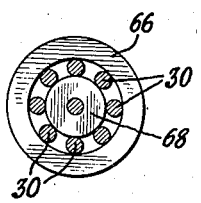
INVENTORS
CHALMERS K. BRYCE
PETER R. ARONSON
BY
ATTORNEY Patented Oct. 8, 1940

2,217,194

UNITED STATES PATENT OFFICE 2,217,194

METHOD FOR MAKING BLOWPIPE NOZZLES

Chalmers K. Bryce, Cranford, and Peter R. Aronson, Millburn, N. J., assignors to Oxweld Acetylene Company, a corporation of West Virginia Application October 9, 1937, Serial No. 168,144

12 Claims. (Cl. 29—157)

This invention relates to the art of forming nozzles or the like having a plurality of relatively small passages in closely spaced relation, and particularly to a method of making oxyacetylene cutting nozzles of the type that deliver a preheat gas circumferentially about, and in close proximity with, a stream of oxygen.

Certain prior known methods of making nozzles of this type employ blanks of shorter length and of greater diameter than the desired ultimate dimensions of the finished nozzles. These blanks are drilled to provide a number of conduits extending longitudinally therethrough, including a central oxygen passage and a series of preheat passages circumferentially spaced about the oxygen passage. They are initially of a diameter substantially greater than the diameter which they will assume when the blanks are formed into completed nozzles. Wires or mandrels having a diameter equal to the ultimate cross-section of the conduits are loosely positioned therein, and the blanks are preferably subjected to a swaging operation. This operation consists of the repeated circumferential application of blows by two oppositely disposed hammers, the contact surfaces of which conform somewhat to the final shape of the finished nozzles. These hammer elements are usually movable about the blank, and receive impulses intermittently from a suitable source. Other methods of forming the blanks have been used, such as forging, rolling, or drawing.

In these prior known methods, a blank is drilled from one end, and although these drills are started accurately, they are, nevertheless, subjected to movement known as "walking" during the drilling operation, so that although the plurality of holes entering the blank are symmetrically located with respect to each other, their points of exit are invariably anything but symmetrical. If the passages surrounding the central oxygen passage are not accurately and symmetrically located, a preheat flame of inferior quality will result. Likewise, these passages at the rear end of the nozzle must be accurately located, otherwise they will interfere with the formation of a gas-tight seat about the same, and about the central passage.

If the severity of the swaging operation exceeds a certain limit, where the metal is cold-worked too much, the metal has a tendency to pulverize, and tearing of the walls between adjacent passages may occur; the hardened metal seizes the mandrels, often requiring the application of intense heat to the blanks, and extreme tensile stress to the mandrels in order to separate them; the alignment of the passages may be displaced into a spiral arrangement; and numerous other difficulties may arise.

An improved method of swaging metal blanks which overcomes the above difficulties is disclosed in United States patent application Serial No. 158,703, filed August 12, 1937, by P. R. Aronson.

An object of this invention is to provide a simple and economical method of making blowpipe nozzles of improved characteristics which will obviate the above and other difficulties. Other objects of this invention include, the provision of a method of pressure-forming, as distinguished from swaging, a drilled blank or punched disc of ductile metal to effect its cold-flowing towards one end of the blank or disc only; the provision of a method of pressure-forming a metal blank so that the pressure applied to the blank or disc will be uniformly transmitted over the entire peripheral surface of the same; the provision of a method of pressure-forming blowpipe nozzles in which the blanks are gradually elongated and the oversize passages gradually reduced by employing a relatively large number of separate and successive pressure-forming operations with successively smaller diameter mandrels; the provision of a method of pressure-forming blowpipe nozzles in which a definite sequence of steps is maintained including the step of annealing the metal blanks after certain pressure-forming operations; the provision of blowpipe nozzles having uniform or tapered gas passages, the entrance and exit of each of which are in substantially identical symmetry and alignment; and the provision of blowpipe nozzles possessing a maximum number of gas passages of any desired cross-section, converging toward the flame end of the nozzle, located in close proximity with a central passage, and in which a sufficient wall thickness between the passages is maintained, thus eliminating buckling of the walls as a result of a pressure-forming operation.

The above and other objects, as well as the novel features of this invention, will become apparent from the following description considered in connection with the accompanying drawings, in which:

Fig. 1 is a view, partly in section and partly in elevation, which discloses a punch and mandrel assembly, a blank and a die, constituting one form of certain elements which may be used in practicing the method of this invention;

Fig. 2 is a view, partly in section and partly in elevation, disclosing the manner in which the blank is mounted on the mandrels prior to the pressure-forming operation;

Fig. 3 is a view, partly in section and partly in elevation, showing certain of the elements in position at the beginning of the pressure-forming operation;

Fig. 4 is a view, partly in section and partly in elevation, showing the arrangement of the aforesaid elements at the conclusion of the pressure-forming operation of this method;

Fig. 5 is a view, partly in section and partly in elevation, showing the relation of the punch and mandrel assembly with respect to the die and pressed blank during the reverse stroke of the pressure mechanism;

Fig. 6 is a cross-section of the die taken along line 6—6 of Fig. 4;

Fig. 7 is a view, partly in section and partly in elevation, showing the pressed blank;

Fig. 8 is a sectional elevation of one form of a finished nozzle, made from a blank pressure-formed by the method of this invention;

Figs. 9 and 10 are, respectively, a longitudinal section through one member of a composite blank, and an end elevation of said blank illustrating another modification of the invention;

Figs. 11 and 12, respectively, are longitudinal sections through an assembly of parts of the last-named modification, in successive stages of the process;

Figs. 13 and 14, respectively, designate an end view and a longitudinal section through an assembly of members forming another modification of the invention;

Fig. 15 is a fragmentary longitudinal section through a modified nozzle blank assembly and associated press parts and mandrels;

Fig. 16 is a longitudinal section of a nozzle made from the assembly of Fig. 15, at a later stage of the process; and Fig. 17 is a view of the left end of the nozzle blank-mandrel assembly of Fig. 15.

In accordance with the present invention, hard-drawn copper rod-stock, or the like, is cut into blanks 10 by any conventional machine shop practice; for example, an automatic screw machine or the like may be used. The cross-section of the rod-stock is greater, and the cut-off length is less than the corresponding dimensions of the nozzle to be formed. In the present instance, one inch rod-stock is cut into one and one-half inch, or two inch lengths, depending upon the type of nozzle to be formed. The specific dimensions referred to, of course, vary, depending upon the length and thickness of the nozzle desired to be manufactured. During the cutting-off operation, a conventional forming tool may be used to round the corners of the blank thus preventing interference when it is subsequently placed into a jig for a drilling operation.

The blank 10 is provided with a central passage 13 coinciding with its longitudinal central axis, and from three to ten preheat passages 12 are arranged in a circle about the passage 13, depending upon the type of nozzle to be manufactured. These passages 12 and 13 are drilled oversize for a purpose to be described later. It is desirable and advantageous to locate the flame end of the passages 12 as near the central passage 13 as possible; and when it is desired to arrange as many as ten preheat passages about the central passage 13, it is obviously necessary to locate them as close to each other as possible. However, it has been found that a definite proportion must be maintained between the wall thickness separating these passages 12 and 13 and their cross-sectional areas, especially at the flame end of the nozzle blank where they are spaced in close relation to each other, otherwise buckling of these walls may occur during the pressure-forming operation.

It is likewise desirable that the entrance of the passages 12 be arranged on a circle of relatively large diameter at the rear of the nozzle blank 10, positioning them as near the edge of the blank as is practical, and still maintaining sufficient material to form a gas-tight seat. This arrangement also affords sufficient material between the circular arrangement of passages 12, and the central passage 13 to form a gas-tight seat about the latter passage. The passages 12 may be formed along parallel axes, converging axes, or axes which are parallel over part of their length and converging over another part. In the present embodiment of the invention, the passages 12 converge toward the flame end of the nozzle blank 10.

The oversize passages 12 and 13 are preferably drilled simultaneously from opposite ends of the blank by a pair of aligned drills so that they may be accurately disposed within the blank. One suitable method of drilling the blank 10 is disclosed in United States patent application Serial No. 159,659, filed August 18, 1937, by P. R. Aronson.

For the purpose of removing any chips and foreign matter that may have collected on the blank 10 during the drilling operation, it may be successively washed in a suitable cleansing medium, such as a solution of water and potash, and then in extremely hot water. Then it may be dried by compressed air. After drying, the blank is annealed at a temperature of approximately 900° F., or to such a degree that the metal will give a reading below zero on the "B" scale of the "Rockwell" hardness tester when a weight of one hundred kilograms is employed with a one-sixteenth inch penetrating ball. Such a degree of hardness has been found sufficient to permit the first pressure-forming step or steps without impairing the process or affecting the mandrels. After the annealing step, the blank may be pickled in a solution of commercial sulphuric acid in order to remove the copper oxide that forms on it during the annealing operation; bright-dipped in a solution of nitric acid; and finally washed in hot water and dried with compressed air. These operations properly condition the blank for the first pressure-forming step.

Having the blank in proper condition for pressure-forming, it is dipped in lard oil or any other suitable lubricant, and is mounted on a first mandrel assembly which likewise has been oiled. The mandrels are adapted to control the reduction of the oversize passages during the first pressure-forming step.

The method of this invention contemplates the forcing of the annealed blank 10, with the mandrels within its oversize passages, into a die or pressure device arranged to contact the entire peripheral surface of the blank, and the application of a continuous and uninterrupted force axially against one end of the blank, sufficient to effect cold-flowing of the metal. In the disclosed embodiment, the pressure device comprises a die 14 consisting of an elongated cylindrical body-portion, one end of which is provided with means in the form of a flange 16, arranged to contact a horizontal surface of the bed plate of a press (not shown), while the cylindrical portion may be received in a bore in the bed of the press. A polished pressure surface 18 of diminishing cross-section is provided in the lower portion of the die 14. The surface 18 is substantially in the form of the finished nozzle but of only slightly less cross-section than the blank 10. A guide surface 20 leading to the pressure surface 18 is provided at the entrance of the die 14, for guiding the blank 10 toward the pressure surface 18.

The continuous application of force effecting the pressure-forming, forces or extrudes the metal of the blank in only one direction, namely, toward the flame end of the blank. If the cold-working of the metal of blank 10 is too severe, an extreme frictional force between the metal and the mandrels will be set up, which may produce sufficient tension in the mandrels to cause them to break, or crushing of mandrels may occur.

Regarding the degree of severity of the pressure-forming operation, it has been found that it is dependent upon the character of the metal being formed. That is, the amount of cold-working to which a copper blank may be subjected without impairing the process, and breaking or crushing of the mandrels is dependent upon the hardness imparted to the metal by such cold-working. Preferably, the hardness produced by any particular pressure-forming operation or series of operations should not exceed a reading of about 35 to 40 on the "B" scale of the "Rockwell" hardness tester when a weight of one hundred kilograms is employed with a one-sixteenth inch penetrating ball. Although the pressure-forming increases the length of the blank 10, the control of the reduction in external diameter as well as the reduction of the cross-sectional area of the passages is of primary importance in order to avoid failure of the blank or damaging the mandrels. Generally it is possible to control the rate of increased hardness and keep it within the above limits by restricting the reduction of cross-sectional area of the blank during each pressure-forming operation or operations to approximately twenty-five percent of the immediately previous cross-sectional area.

It will be understood, however, that variations in the original diameter of the metal blanks, and the disposition of the passages therein govern the rate at which the cross-sectional area can be reduced and still retain the hardness of the metal within the permissible limits. With a large number of closely spaced passages, less wall metal will be present and the degree of reduction of the cross-sectional area for any particular pressure-forming operation may be less. In any case, however, the permissible degree of area reduction can be readily determined by trial for any batch of copper, the desired size of blank, and the finished construction of the nozzle. It is only necessary to determine the degree of pressure-forming that may be accomplished without rendering the metal so hard as to cause failure of the blank and damage to the mandrels.

The type of mandrels employed, also to a great extent, governs the rate at which the cross-sectional area of the blank can be produced. One form of a combined punch and mandrel assembly, in which the mandrels are capable of withstanding the intense friction set up due to the cold-working of the blank 10, is disclosed and claimed in United States patent application Serial No. 248,725, filed December 31, 1938, by P. R. Aronson.

This punch and mandrel assembly comprises a pressure transmitting element 22 having an elongated body portion 24, ground peripherally to provide an accurate sliding fit with the guide portion 20 of the die 14. The length of the elongated portion is greater than the extent to which the same enters the die 14, thus providing a clearance between the top surface of the die 14 and a head 26. The head 26 is constructed in a manner to facilitate its engagement with a chucking device 28 of the press. In the disclosed embodiment, the head 26 comprises a relatively thick flanged portion integral with the elongated body portion of the pressure transmitting element 22. The flanged head 26 is arranged to be received by the chucking element of the press, and may reciprocate with the same during the operation of the press.

Mandrels 30, equal in number to the oversize passages 12 and 13, are removably held in the pressure transmitting element 22 in positions corresponding to the relative location of the plurality of passages 12 and 13 of blank 10. The design and construction of the mandrels 30 may be such as to lessen the frictional force set up between them and the cold-flowing metal. They may be constructed of heat-treated wire or rod, and provided with a shank portion, equal in length to the over-all length of the pressure transmitting element 22. The forward portion of each mandrel 30 may be tapered in the direction of the flow of metal of blank 10 during the pressure-forming operation. The tapered construction of the mandrels, together with the fact that they are made from heat-treated wire or rod lessens the frictional force set up between the cold-flowing metal and the mandrels. This is due, at least in part, to the highly polished and hard surface of the heat-treated wire or rod from which they are made.

The cost of producing tapered mandrels of the above-described type is substantial, when compared with the cost of piano wire mandrels, and in some instances, the latter may be more profitably used to control the reduction in cross-sectional area of the passages 12 and 13. However, when mandrels of piano wire are employed, the degree of cross-sectional reduction per pressure-forming step must be substantially less than when tapered mandrels are employed. It therefore must be determined in each case whether it is more profitable to use inexpensive mandrels with more pressure-forming steps, or expensive mandrels with less pressure-forming steps.

A bronze knob 32 is provided at the shank end of each mandrel 30. Since the temperature to which the mandrels are subjected in order to impart sufficient hardness and flexibility thereto is substantially less than the melting point of bronze, the mandrels may be heat-treated after the bronze knob has been welded thereto.

The pressure transmitting element 22 is equipped with a series of passages 34 equal in number to the mandrels 30 desired to be used. The length of the passages 34 provides means for supporting the mandrels along a substantial portion of their length, thus adding to the stability of the assembly. The passages 34 are provided with a counterbored portion 36 for receiving the bronze knobs 32 thus preventing the withdrawal of the mandrels in one direction while permitting their ready interchangeability. A sliding spacer element 38, provided with passages corresponding to the number of mandrels 30, is slidably positioned on the mandrels to facilitate the assembly of the drilled blank 10 thereon.

After the blank 10 has been mounted on the mandrels 30, the assemblage is rigidly held in the chuck 28 of the power press by a plurality of spring-pressed plungers 29 which engage the under surface of the head 26 as illustrated in Fig. 2. During the downward motion of the cross-head of the power press, the blank 10 is forced into engagement with the forming surface 18 of die 14. Alternatively, the blank 10 (mounted on mandrels 30 and element 22) may be inserted in die 14, and when chuck 28 moves down, the plungers 29 engage the head 26 and thus grip it. Upon the up stroke of chuck 28, it will pull element 22 and mandrels 30 from the blank 10. This pressure-forming operation causes the metal of blank 10 to flow in one direction only, namely, towards the flame end of the nozzle. The cold-flowing metal engages the mandrels 30 at their extremities, and places them under tension sufficient to maintain them in proper position. During the beginning of the return stroke of the cross-head, the punch and mandrel assembly is removed from the pressed blank leaving the same within the die 14. The pressed blank is ejected from the die 14 by conventional means (not shown) attached to the power press. In the present instance, this comprises a push-out rod effective to engage the flame end of the pressed nozzle blank during the latter portion of the return stroke of the power-press cross-head.

Having determined the degree of reduction which is possible for the particular design of nozzle and grade of copper employed, the least number of pressure-forming steps and changes of mandrel size may be determined. Thus, after the first pressure-forming step has been performed as described above, the blank 10 may be washed, annealed, pickled and bright-dipped before mounting it upon the mandrels or wires of the second mandrel assembly which may be constructed to permit a further reduction of the diameters of the passages 12 and 13. This procedure of oiling and inserting mandrels, pressure-forming, and extracting mandrels, is now repeated, using each time a smaller size mandrel wire and a smaller size forming die-surface 18. Thus a considerable number of comparatively slight reductions in metal will take place during the pressure-forming, and the resulting piece is not distorted or the mandrels damaged as might otherwise be the case. The wire mandrels, and the die-surface 18, used in the finishing pressure-forming operation are of the same diameter and form as the desired passages, and contour of the finished piece.

The series of dies 14 having gradually reduced forming surfaces 18 may have constant diameter guide surfaces 20 in order to accommodate the shank portion 24 of the punch 22. Thus it is apparent that the successively smaller diameter mandrel wires may be interchangeably employed with the same punch 22.

It will be apparent that the character of the metal and the permissible degree of reduction may be such that in certain instances a blank may be given more than one pressure-forming operation while employing the same mandrels, thus further elongating the blank and reducing its external diameter without further reducing the diameters of the passages 12 and 13. Also, certain of the pressure-forming steps may be carried out on only a portion of the blank, such as the tip or flame end thereof. However, no matter what the details of the particular pressure-forming step or steps are before the mandrels are changed and the blank annealed, the hardness of the metal is preferably maintained within the limits set forth above so that neither failure of the blank nor damage to the mandrels will occur.

It will be understood that between each successive reduction of bore or passage diameter, or before mounting the blanks upon a mandrel, the diameter of the mandrels or wires of which are less than those previously employed, the blank may be properly washed in order to remove the oil or grease that collects thereon during the pressure-forming operation. Whenever necessary, which is usually prior to each change in mandrels, the blank may be annealed or otherwise treated to increase the grain growth and restore the ductility to a point where it will effect a reading of below zero on the "Rockwell" tester. Pickling and bright-dipping are also utilized after each annealing step, as previously explained.

When the blank has been pressure-formed to the desired dimensions, it may be machined and finished in various forms, one of which is shown in Fig. 8. This particular construction requires extreme accuracy in the location of the central passage 13, and the preheat passages 12. Such accuracy is obligatory in the construction of a gas-tight seat 40 from the material between the central passage 13 and the circular arrangement of the passages 12, as well as a seat 42 at the outer peripheral edge of the nozzle blank 10.

The principles underlying the method of this invention may be effectively used in the production of blowpipe nozzles without employing any drilling operation throughout the process of manufacture. This may be accomplished by punching holes in a copper plate equal in number to the passages desired for conducting the oxygen and acetylene gases, and punching a disc from this plate including these holes. The perforated disc is then elongated, and reduced in diameter to produce a blank having the dimensions of the drilled blank 10 by the same pressure-forming operations performed on said blank. The pressed blank is then subjected to the identical steps described in connection with the formation of the pressed nozzle. Prior to each pressure-forming operation, the punched copper disc will be properly annealed and treated in the manner described in connection with blank 10, to impart the desired ductility to the metal.

It is further to be understood that multi-piece nozzles, formed from two or more concentrically arranged tubular members, as disclosed in United States patent application Serial No. 159,826, filed August 19, 1937, by P. R. Aronson et al. may be produced by the herein-described method and apparatus.

Thus a plurality of concentric sleeves or tubular members of ductile metal may be assembled in nested form to provide annular passages therebetween. A plurality of spaced mandrels then may be inserted within each of said annular passages; after which the cross-section of each assembly of tubular members may be gradually reduced and the assembly elongated by subjecting it to a series of separate and successive pressure-forming operations, each of which preferably includes applying to one end of said assembly an uninterrupted force directed axially thereof.

Similarly, a blank of heavy malleable metal tubing having tapered side walls may have spaced longitudinal slots formed in its outer periphery. The blank then may be inserted within an internally-tapered metal sleeve. The resultant assembly then is gradually elongated and is reduced in cross-section by subjecting the assembly to a series of separate and successive pressure-shaping operations of the type hereinbefore described. Successively smaller mandrels are employed within the passages formed by the respective slots and the tapered sleeve during certain of the successive pressure-shaping operations.

Again, a plurality of relatively thin-walled tubes of ductile metal may be assembled within an annular outer sleeve of such metal. The resultant assembly then is gradually elongated and its cross-section reduced in the manner described above, utilizing a continuous uninterrupted force applied axially of said sleeve and tube assembly, and employing successively smaller mandrels within each of said thin-walled tubes during certain of the pressure-forming operations.

Referring to Figs. 9 to 12 of the drawings, the tapered tubing 50 having the central passage 51 has longitudinal slots 52 formed in its outer periphery. The member 50 is inserted within an outer sleeve 54; and the assembly is introduced into the press illustrated in Figs. 1 to 4 in any suitable manner with the tapered mandrels 30 extending into the slots 52 at suitable spaced points. Pressure is then applied to reshape and form a composite torch nozzle in the manner hereinbefore described.

Figs. 13 and 14 illustrate a modification of composite assembly wherein a plurality of spaced tubes 60 having passages respectively therethrough are disposed longitudinally within an outer tubular sleeve 62 of ductile metal, the arrangement being such that each of the respective mandrels 30 will enter a corresponding passage in the tubes 60 when the assembly is placed in the press for pressure reshaping according to the invention.

In the modification illustrated in Figs. 15 to 17, a plurality of concentric tubular members 66 and 68 are nested in suitable manner, with tapered mandrels 30 extending within the annular spaces defined between adjacent sleeves, and within a central passage in member 68. The pressure-shaping operation then is conducted in manner similar to that described in connection with the previously described modifications of the invention.

Fig. 16 shows the blank assembly of Fig. 15 at a subsequent stage of the reshaping operation, but before withdrawal of the mandrels 30'.

While the principles of this invention are shown and described as applied to the manufacture of blowpipe nozzles, it is to be understood that any metal articles of manufacture having one or more passages extending therethrough may be produced in accordance with the principles of this invention. Furthermore, minor changes may be made in the apparatus and steps of the method without departing from the spirit of this invention.

What is claimed is:

1. A method of making nozzles and the like which comprises gradually elongating and reducing the cross-section of a metal blank having a plurality of closely spaced oversize passages therein by subjecting said blank to a series of separate and successive continuous pressure-forming operations, each of which includes applying an uninterrupted force axially to one end of said metal blank; and employing successively smaller mandrels within said passages during certain of the pressure-forming operations.

2. A method of making nozzles and the like as claimed in claim 1, in which the axial force moves the blank into a die of diminishing cross-sectional area.

3. A method of making nozzles and the like as claimed in claim 1, in which said blank is annealed prior to each change to successively smaller mandrels.

4. A method of making nozzles and the like as claimed in claim 1, in which the average percentage of reduction of cross-sectional area effected by each pressure-forming operation is about 25%.

5. A method of making nozzles and the like as claimed in claim 1, in which the hardness effected by any of the pressure-forming operations before the blank is annealed is not greater than about 40 Rockwell B.

6. A method of making oxy-acetylene blowpipe nozzles and the like which comprises perforating a ductile metal disc with apertures corresponding in number to, and spaced in position corresponding with, the desired number and arrangement of gas passages within the nozzles to be formed; and gradually elongating and reducing the cross-section of such disc by subjecting it to a series of separate and successive pressure-forming operations, each of which includes applying an uninterrupted force axially to one end of said metal disc; and employing successively smaller mandrels within said one or more passages during certain of the separate pressure-forming operations.

7. A method of making blowpipe nozzles and the like which comprises assembling a plurality of concentric sleeves providing annular passages therebetween; inserting a plurality of mandrels within said annular passages; and gradually elongating and reducing the cross-section of such assembly by subjecting it to a series of separate and successive pressure-forming operations each of which includes applying an uninterrupted force axially to one end of said sleeves.

8. A method of making oxy-acetylene blowpipe nozzles and the like which comprises forming a tapered slug from heavy tubing of malleable metal having peripherally-spaced longitudinally-extending slots; inserting said slug within an internally tapered sleeve; and gradually elongating and reducing the cross-section of the assembly by subjecting it to a series of separate and successive pressure-forming operations, each of which includes applying an uninterrupted force axially to one end of said sleeve; and employing successively smaller mandrels within the passages formed by the slot and the tapered sleeve during certain of the pressure-forming operations.

9. A method of making oxy-acetylene blowpipe nozzles and the like which comprises assembling an annular outer sleeve and a plurality of relatively thin-walled tubes within said sleeve; and gradually elongating and reducing the cross-section of said assembly by subjecting it to a series of separate and successive pressure-forming operations, each of which includes applying an uninterrupted force axially to one end of said sleeve; and employing successively smaller mandrels within said thin-walled tubes during certain of the pressure-forming operations.

10. A method of making a blowpipe nozzle which comprises providing a ductile metal blank with a plurality of substantially parallel oversize passages; gradually elongating and reducing the cross-section of such blank and said passages by subjecting said blank to a series of separate and successive pressure-forming operations, each of which includes applying an uninterrupted force axially to one end of said metal blank while each of said passages contains a mandrel; successively substituting sets of mandrels of smaller diameter after certain of said separate pressure-forming operations; annealing said blank prior to each substitution of a set of smaller mandrels; and so correlating the successive pressure-forming operations that the average reduction of cross-sectional area effected by each pressure-forming operation is about 25% and the hardness effected by any of the pressure-forming operations before the blank is annealed is not greater than about 40 Rockwell "B".

11. A method of making a blowpipe nozzle which comprises providing a ductile metal blank with a plurality of oversize passages; gradually elongating and reducing the cross-section of such blank and said passages by subjecting said blank to a series of separate and successive pressure-forming operations, each of which includes applying an uninterrupted force axially to one end of said metal blank while each of said passages contains a mandrel; successively substituting sets of mandrels of smaller diameter after certain of said separate pressure-forming operations; annealing said blank prior to the substitution of a set of smaller mandrels; and so correlating the successive pressure-forming operations that the average reduction of cross-sectional area effected by each pressure-forming operation is about 25% and the hardness effected by any of the pressure-forming operations before the blank is annealed is not greater than about 40 Rockwell "B".

12. In a method of making a blowpipe nozzle, the steps which comprise applying an uninterrupted pressure axially to an end surface of a tubular blank of ductile metal having peripheral and end surfaces and a plurality of oversize passages extending longitudinally therethrough, while each of said passages contains a mandrel, and while confining said peripheral surfaces of the blank within a die having converging walls against movement away from the longitudinal axis of said blank, said pressure being of sufficient magnitude to cause cold flow of said metal as the blank is forced through said die, progressively reshaping and reducing the respective longitudinal cross-sectional areas of said blank and of said passages under the action of said pressure, and discontinuing the application of said pressure before the metal of the reshaped blank attains a hardness of about 40 Rockwell "B".

CHALMERS K. BRYCE.
PETER R. ARONSON.